United States Patent [19]

Skrypalle

[11] Patent Number: 4,909,374

[45] Date of Patent: Mar. 20, 1990

[54] FLAT ARTICLE DIRECTION CHANGING DEVICE

[75] Inventor: Manfred Skrypalle, Bensheim, Fed. Rep. of Germany

[73] Assignee: Pitney Bowes Inc., Stamford, Conn.

[21] Appl. No.: 818,411

[22] Filed: Jan. 13, 1986

[51] Int. Cl.[4] .............................................. B65G 47/46
[52] U.S. Cl. .................................... 198/371; 198/437; 198/624; 198/787; 271/225; 271/246; 271/265
[58] Field of Search ............... 198/371, 372, 437, 457, 198/624, 787; 271/229, 246, 265, 266, 299

[56] References Cited

U.S. PATENT DOCUMENTS

| | | | |
|---|---|---|---|
| 3,079,150 | 2/1963 | Lopez | 271/225 |
| 3,179,234 | 4/1965 | Bloom et al. | 198/457 |
| 3,360,099 | 12/1967 | Barr | 198/624 |
| 3,532,338 | 10/1970 | Brinson et al. | 271/246 |
| 3,861,673 | 1/1975 | Ticknor | 271/225 |
| 4,573,848 | 3/1986 | Lundblad | 198/624 |

FOREIGN PATENT DOCUMENTS 2042887 9/1978 Fed. Rep. of Germany ...... 198/457

Primary Examiner—Joseph E. Valenza
Attorney, Agent, or Firm—Peter Vrahotes; Melvin J. Scolnick; David E. Pitchenik

[57] ABSTRACT

A device for guiding flat articles being fed horizontally and changing the direction of movement from one direction to another wherein the change in direction may be as great as 90°. This is accomplished by providing a housing with internal rollers capable of being rotated in one of two directions.

6 Claims, 3 Drawing Sheets

FLAT ARTICLE DIRECTION CHANGING DEVICE

BACKGROUND OF THE INVENTION

Devices are known which turn flat articles, such as letter envelopes, within a plane. These devices are required where envelopes are discharged from an inserter and are not properly oriented to be fed to a downstream device such as a franking machine. An inserter is a machine that places selected items into an envelope then seals the envelope. The filled and sealed envelope is then conveyed to a franking machine to have postage imprinted thereon. Prior devices are of the type that have the disadvantage of not only having to turn the envelope to have it properly oriented but are also an integral part of the inserting machine.

SUMMARY OF THE INVENTION

In the device of the instant invention, the direction of travel for flat articles, for instance sheets of paper, can be changed without changing the orientation of the forms, i.e., without rotating or turning the articles. According to the instant invention, the device has a rectangular box-like lower part and a rectangular box-like upper part pivotally connected to one another. The driving mechanism for the insertion of the flat articles into the device and for conveying in a first direction of movement is located in the box-like upper part. The driving mechanism for the change of the direction of movement and ejection of the flat articles from the device into a second direction of movement is located in the box-like lower part. The upper and lower driving systems are independent of one other, each including a motor, for instance, a direct current motor, and feeding rollers driven by the motor; therefore, the entire device is independent of any machine or device that precedes or follows it and to which the device of the invention can be connected through a synchronization line.

DETAILED DESCRIPTION OF THE PREFERRED EMBODIMENT

Figure 1:
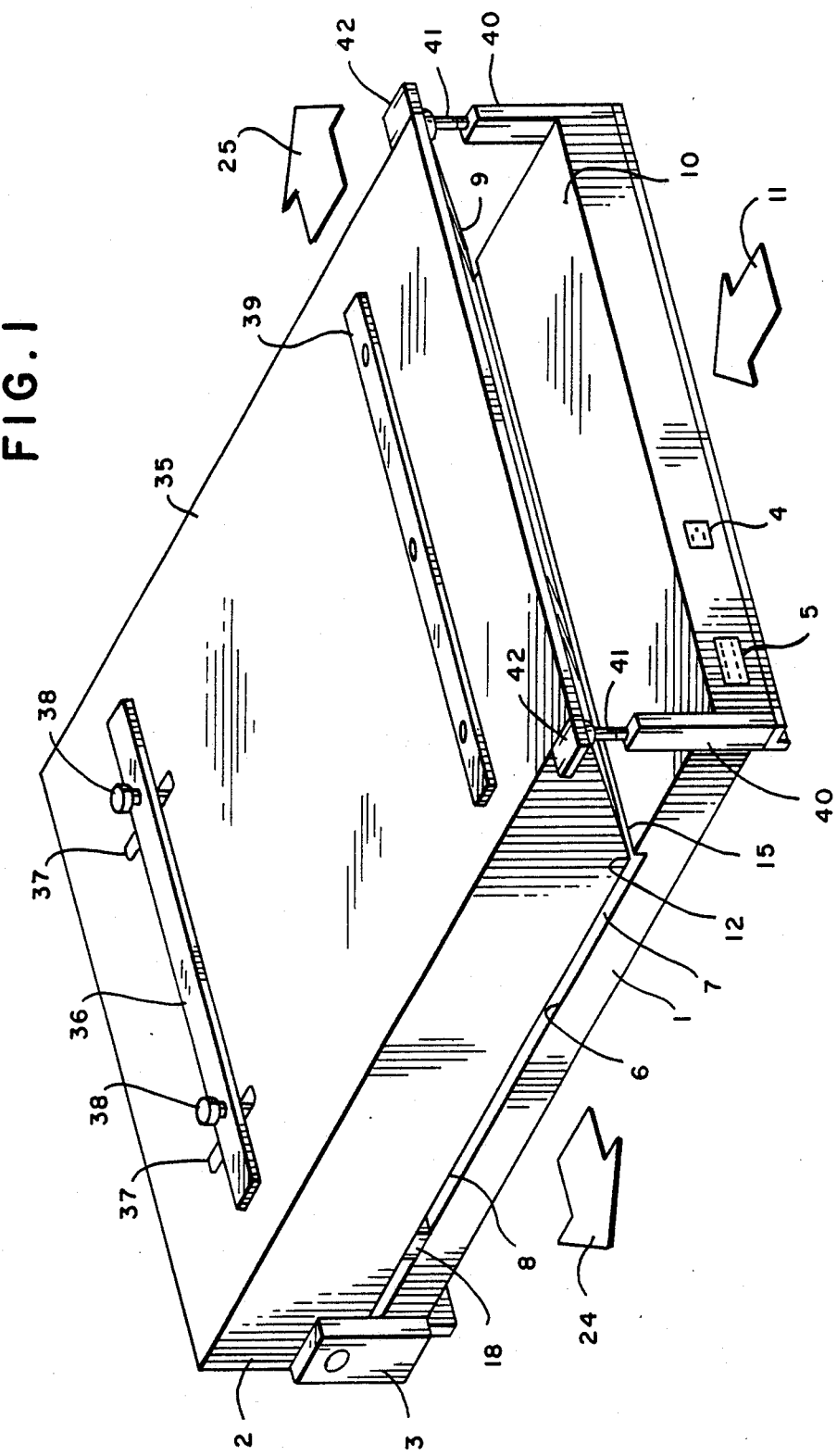
FIG. 1 is a perspective view of a device that incorporates the instant invention.

Referring now to FIG. 1, a flat article direction changing device is shown which includes a box-like lower part 1 and a box-like upper part 2, the back sides of which are pivotally connected through a hinged joint 3. Independent driving means are provided in each part 1,2 as will be described in detail hereafter.

Figure 2:
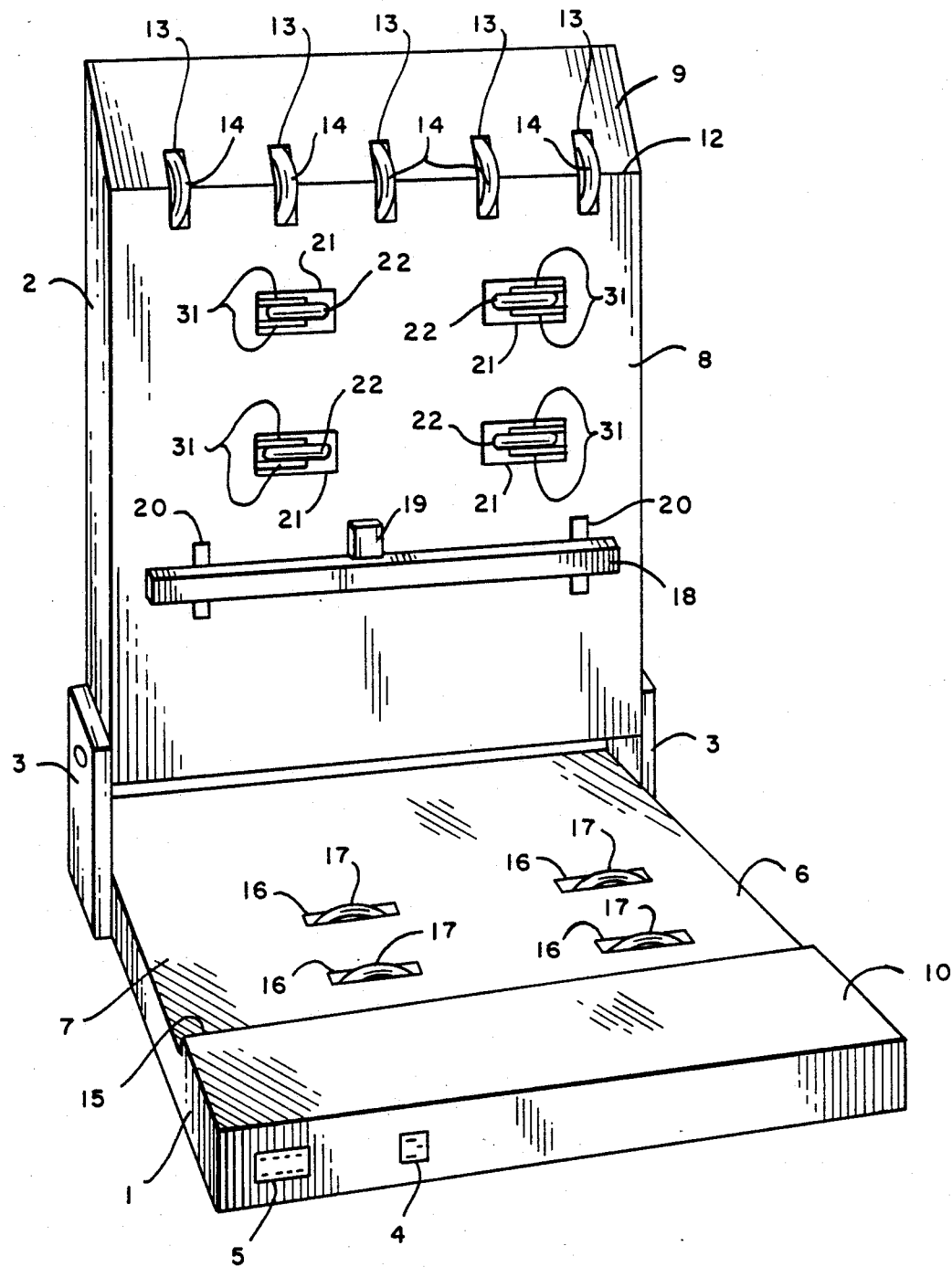
FIG. 2 is a perspective view of the device shown in FIG. 1 with its upper portion lifted.

The front side of the device is provided with a socket 4 for receiving a power supply line and with a socket 5 for receiving a synchronization line for connection and cooperation with another device. The box-like lower part 1 has a sloping upper surface 6 forming a recess 7 for receiving a flat article. The bottom surface 8 of the box-like upper part 2 is provided at the front side with a sloping surface 9 which extends inwards towards that portion of the recess 7 formed between a land 10 and the surface 6 on one hand and the bottom surface 8 on the other. The land 10 provides a support for flat articles to be inserted into the recess 7 in the direction of the arrow 11. Referring now to FIG. 2, the bottom surface of the box-like upper part 2 is provided with five rectangular slots 13, in the area of a bend 12 in the upper part, each of which receives a continuously driven inserting roller 14, that project into the recess 7 behind the edge 15 of the land 10 when the upper part 2 is in its lowered position, to engage the leading edge of a flat article inserted over the land edge 15 in the direction of the arrow 11. The upper surface 6 of the lower part 1 is provided with two pairs of rectangular openings 16, which receive ejecting rollers 17, whose circumferences are in alignment with the surface 6 of the lower part 1 thereby enabling contact with a flat article conveyed into the device by the inserting rolls 14. The bottom surface 8 of the box-like upper part 2 is provided with a stop rail 18 and a photocell 19 which controls the inserting and ejecting mechanisms as will be described. The rail 18 and the photocell 19 are movably mounted through cooperation with oblong openings 20, in the bottom surface 8 and can be adjusted in response to the size of an article as will be described hereinafter. The bottom surface 8 of the box-like upper part 2 is provided with rectangular openings 21, that are located opposite the openings 16, when the upper part 2 is in its lowered position. The openings 21, receive pressing rollers 22, that can be lowered to cooperate with the ejecting rollers 17, for driving an inserted article which is to be ejected in a change direction.

Figure 3:
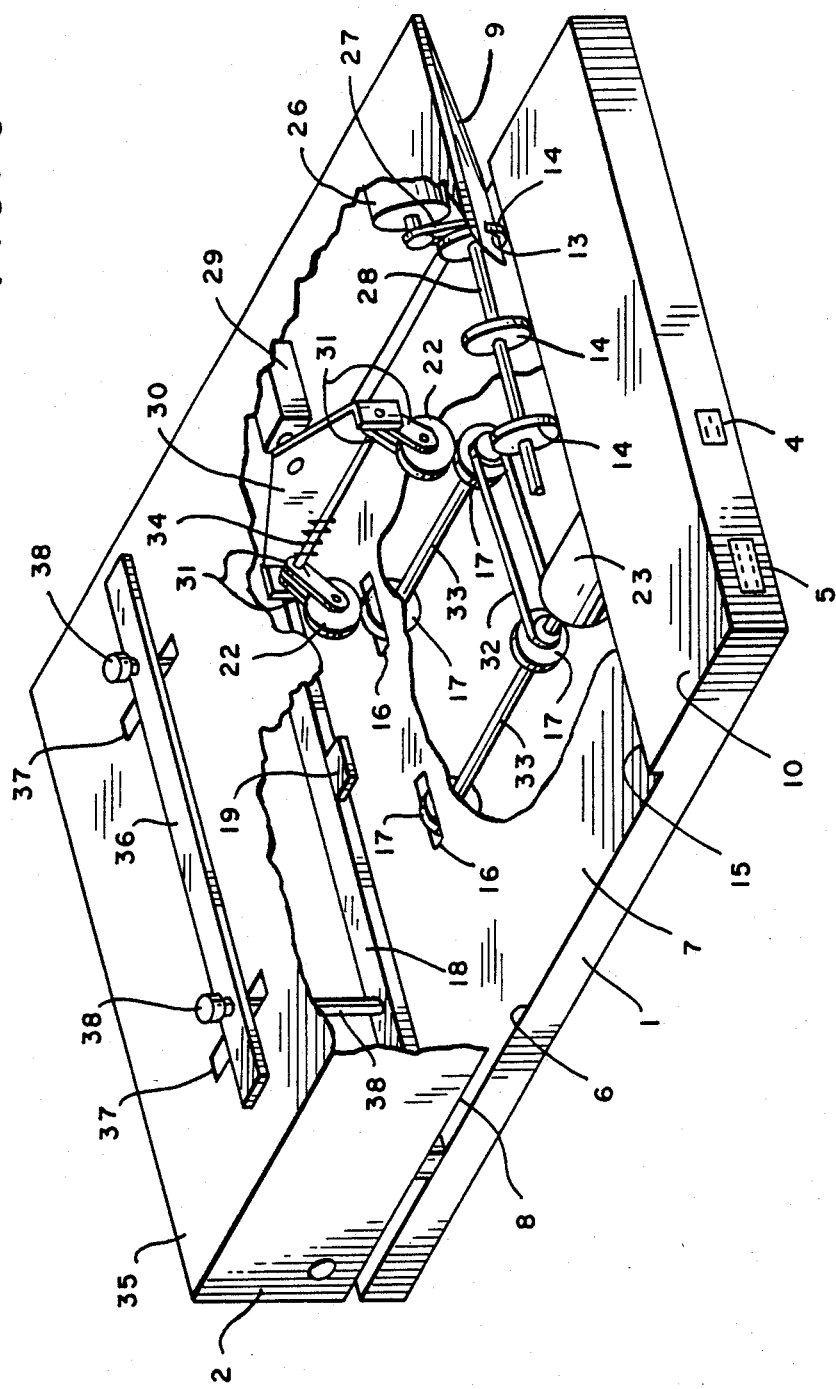
FIG. 3 is a perspective view of the device shown in FIG. 1 with cut-out portions.

The different driving mechanisms will be described with reference to FIG. 3 in which the upper part 2 and the upper surface 6 of the lower part 1 are partly cut away for better illustration. The lower box-like part 1 comprises an ejection motor 23, preferably a direct current motor, whose direction of rotation can be changed selectively by any convenient means in order to move a flat article, inserted with its length normal to the direction of travel normal, as indicated by the arrow 11, selectively in one of two directions represented by the arrows 24 or 25 which are perpendicular to the direction represented by the arrow 11 (FIG. 1). The upper box-like part 2 supports an insertion motor 26,preferably also a direct current motor, which drives a shaft 28 that supports the inserting rollers 14, through a belt 27. When the leading edge of an inserted flat article arrives at the stop rail 18, it is sensed by the photocell 19 which enables two electromagnets 29 (only one being shown) in the upper part 2, each of which then attracts the distal end of respective triangular pivot members 30 (only one being shown) to urge the press rolls 22, mounted on arms 31, downwardly through the cut-outs 21, to bring about contact with the continuously driven ejecting rollers 17, and move the flat article in a changed direction of about 90°.

The orientation of the flat article within its plane is not changed, i.e. it is not turned or rotated, but its width or small sides will now become the leading edge. Therefore, the shaft 28 that supports the inserting rollers 14, is arranged at a right angle relative to the shafts 33 of the ejecting rolls 17. When a flat article is moved in the changed direction for the purpose of being ejected, the photocell 19 will become exposed again and the electromagnets 29 de-energized so that the distal ends of the pivot members 30 (only one being shown) are released and the arms 31 with the pressing rolls 22 can return into their lifted position, for instance by means of suitable springs 34 (only one being shown).

A rail 36, see FIG. 1, is provided on a surface 35 of the box-like upper part 2 as an adjustment aid for adjusting the stop rail 18 to the size of the sheet to be processed. The rail 36 is mounted upon oblong opening 37 which are in registration with the oblong openings 20 and is secured to the stop rail 18 by adjustment bolts 38. The adjustment is performed by inserting one of the flat articles between the rail 36 and a stationary rail 39 on the surface 35, loosening the adjustment bolts to allow movement of the rails 18, 36, contacting the edge of the rail 36 with the edge of the flat article and tightening the adjustment bolts. An adjustment for different thickness of the flat articles can be made by means of adjustment bolts 41 mounted in corner posts 40 which adjustment support bolts blocks 42 connected to the front edge of the box-like upper part 2. By turning the adjustment bolts the distance between the lower part 1 and the upper part 2 may be changed thereby increasing or decreasing the size of the space therebetween.

What is claimed is:

1. An apparatus for changing the direction of travel of a flat article, comprising
    a generally rectangular house having an upper part and a lower part pivotally connected, a first longitudinal opening located within a first side of said housing and a second side having a second longitudinal opening therein that is generally normal to said first side, said second longitudinal opening being parallel with said first longitudinal opening,
    first conveying means located within said housing for conveying into said housing a flat article that is inserted into said first opening, and
    second conveying means located within said housing for conveying a flat article located within said housing through said second opening.

2. An apparatus for changing the direction of travel of a flat article, comprising:
    a housing having an upper part and a lower part pivotally connected and an elongated opening located within three sides thereof, a first of said openings being located in a first side of said housing, a second of said openings being located in a second side that is opposed to said fist side and the third of said openings being located in a third side that is substantially normal to said first and second sides, said first, second and third openings being parallel to one another,
    first conveying means located within said housing for conveying a flat article inserted into said third elongated opening into said housing;
    second conveying means located within said housing for conveying a flat article locate within said housing through said second elongated opening,
    third conveying means located with said housing for conveying a flat article located within said housing through said first elongated opening, and,
    means for alternatively enabling said first and second conveying means.

3. The apparatus of claim 2 including a stop rail located within said space and supported by one of said housing parts.

4. The apparatus of claim 3 including means for adjusting the distance between said stop rail and said third elongated opening.

5. An apparatus of claim 2 including electrical connection means for connecting said housing with another apparatus.

6. The apparatus of claim 2 including means for varying the size of said space by changing the distance between said upper and lower parts of said housing.

* * * * *